April 12, 1960  A. BAUER  2,932,275

CENTRIFUGAL COATING MACHINE

Filed Oct. 13, 1958  3 Sheets-Sheet 1

April 12, 1960

A. BAUER 2,932,275

CENTRIFUGAL COATING MACHINE

Filed Oct. 13, 1958

April 12, 1960  A. BAUER  2,932,275
CENTRIFUGAL COATING MACHINE
Filed Oct. 13, 1958  3 Sheets-Sheet 3
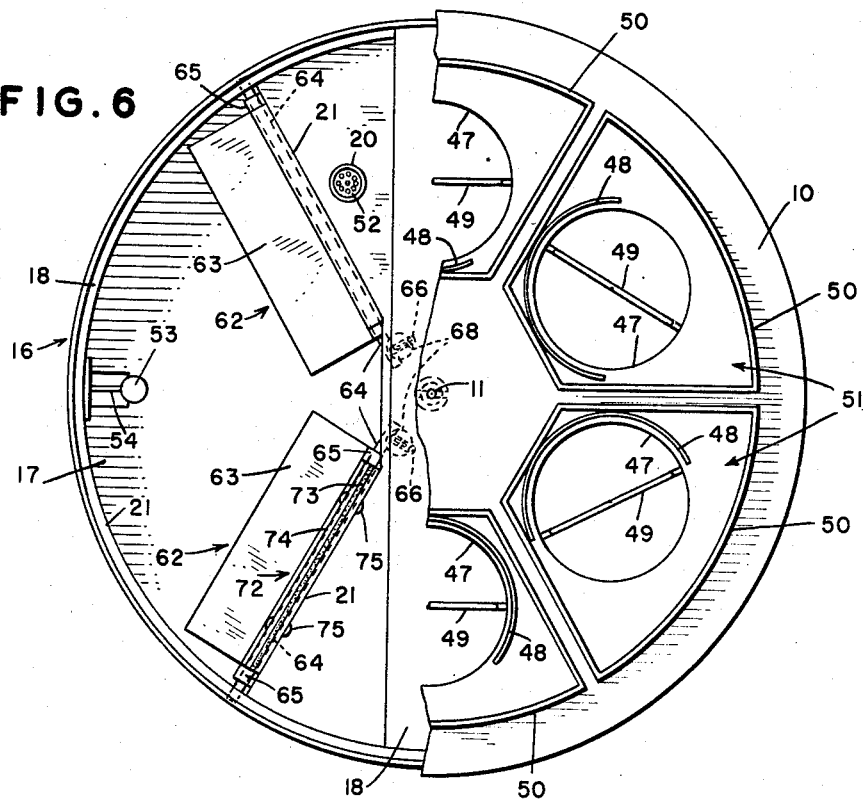
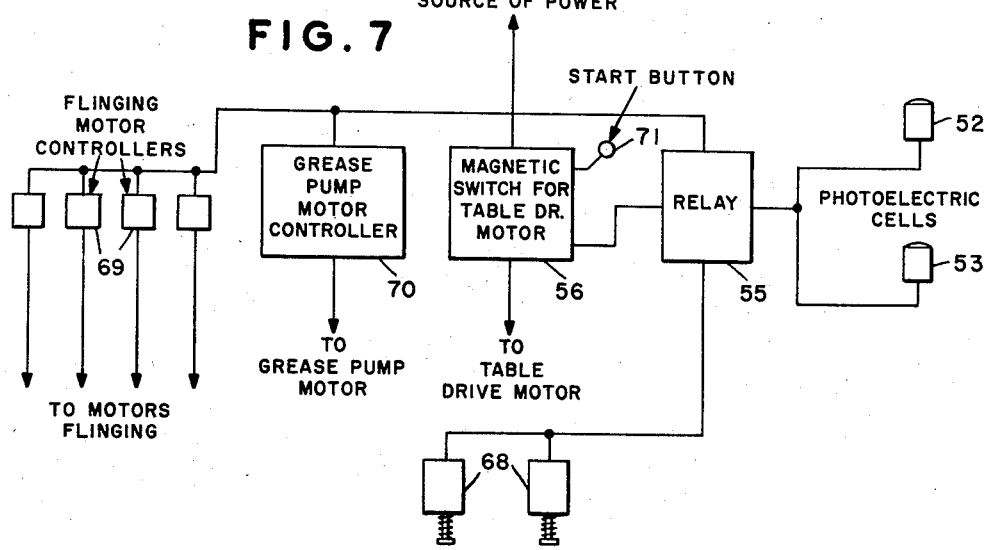

United States Patent Office 2,932,275
Patented Apr. 12, 1960

2,932,275

CENTRIFUGAL COATING MACHINE

Alois Bauer, Brooklyn, N.Y., assignor to Bauer Machine Co. Inc., Mineola, N.Y., a corporation of New York Application October 13, 1958, Serial No. 766,975

3 Claims. (Cl. 118—1)

This invention relates in general to coating machines and particularly to a coating machine for applying grease or the like to baking pans by centrifugal force.

Pans used in a baking establishment must be coated on the inside surface with grease in order to prevent the baked product from sticking and burning. In order to obtain a baked product of constant quality, it is highly desirable that the pans be uniformly greased, but it is also desirable that the quantity of grease to be applied may be varied over a considerable range to meet various desired operating requirements.

It is also highly important that no grease be applied except to the interior portion of the baking pan since any grease which remains on the exterior portion of the pan will be burned during the btking operation with resultant undesirable fumes and odors and also undesirable resultant stains on the baking pan. If the baked product is to be sold in the baking pan, as is frequently done at the present time, such stains are unsightly and may impair the commercial value of the baked goods. If the baked product is subsequently removed from the baking pans and the pans are to be reused, such stains may be difficult or even impossible to remove without damage to the pan. Furthermore, such grease as may be present on the exterior portions of the pans is entirely wasted and may interfere with the subsequent handling of the greased pan by conveying equipment and the like. Such conditions are also regarded as unsanitary.

In the past, pan greasing machines have usually involved a laterally disposed conveyor element which carries the pans past a series of nozzles or other spraying devices. Such an arrangement usually requires two operators, one to feed the ungreased pans, and a second to receive the greased pans. Furthermore, where multiple compartment pans are being greased, it is necessary to utilize a removable template or similar device to shield all surfaces not requiring grease and to clean the template after each pass through the machine. Where relatively deep pans are to be greased, it has been found to be difficult to uniformly grease the interior sides and yet prevent the exterior sides from being greased.

The principal object of the present invention is to provide a novel and improved pan greasing machine. Another object of the present invention to provide a pan greasing machine capable of greasing the inner surface of pans without greasing any portion of the outer surfaces of the pans but which does not require the use of templates or other complex protective devices.

A further object of the present invention is to provide a compact pan greasing machine which requires but a single operator.

A still further object of the invention is to provide a pan greasing machine which is capable of handling pans of various shapes and sizes and which may be operated at various speeds as desired.

Another object of the invention is to provide a pan greasing machine which stops automatically when the flow of ungreased pans is interrupted or when the ungreased pans are improperly located on the machine, but which is capable of automatically adjusting the location of pans within certain limits.

A still further object of the present invention is to provide an enclosed pan greasing machine whereby the grease utilized for greasing the pans is prevented from being contaminated from outside sources or from itself contaminating adjacent work areas.

Further objects and advantages of the invention will be apparent from the following description.

In accordance with the present invention there is provided a rotatable table, driven by an electric motor, and having apertures located therein over which apertures are placed the pans to be greased. Spaced electrically driven centrifugal grease flinging elements are disposed in a grease reservoir compartment beneath the rotatable table and are adapted to distribute grease supplied by an electrically driven sanitary grease pump uniformly to the pans placed on the rotatable table as the pans pass the grease flinging element locations. Photoelectric cells may be mounted below the rotatable table in advance of the grease flinging elements and, if desired, within the grease reservoir compartment. The photoelectric cells act in conjunction with electric circuit means in order to detect pans which may be missing or improperly located on the rotatable table and, upon such detection, to stop the table movement. A pan adjusting device may be positioned in advance of the photoelectric cell detecting devices to correct minor misalignment of the pans on the rotatable table. A further feature involves the use of automatic grease baffles positioned above the grease flinging elements which prevent contamination of the work area in the event that pans are improperly located on the rotatable table or the supply of pans has been interrupted. A still further feature of the invention involves the use of a scraper device located after the flinging elements to direct into the grease reservoir the grease deposited on the underside of the rotatable table.

The invention will now be described in greater detail in connection with the accompanying drawings in which:

Fig. 6 is a plan view of the centrifugal coating machine shown in Fig. 1 in which a portion of the rotatable table is broken away to show the automatic grease baffles and scraping device; and Fig. 7 is a block diagram illustrating the electrical system of the centrifugal coating machine shown in Fig. 1.

Figure 1:
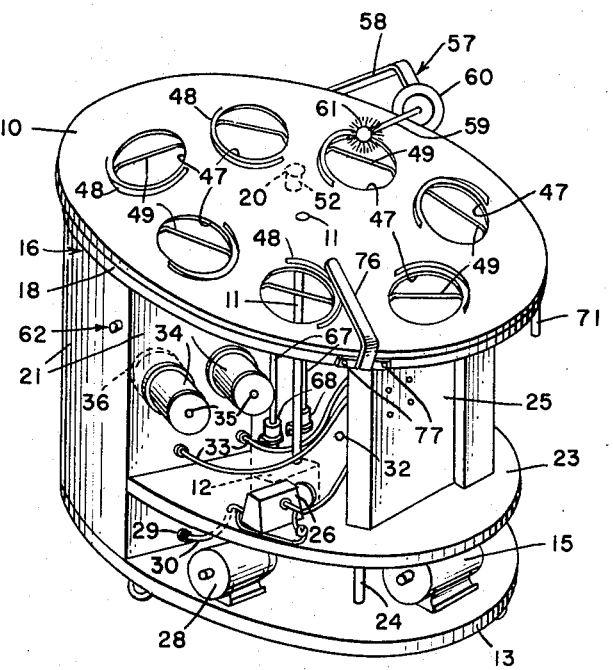
Fig. 1 is a perspective view of a centrifugal coating machine embodying the features of the present invention.
Figure 2:
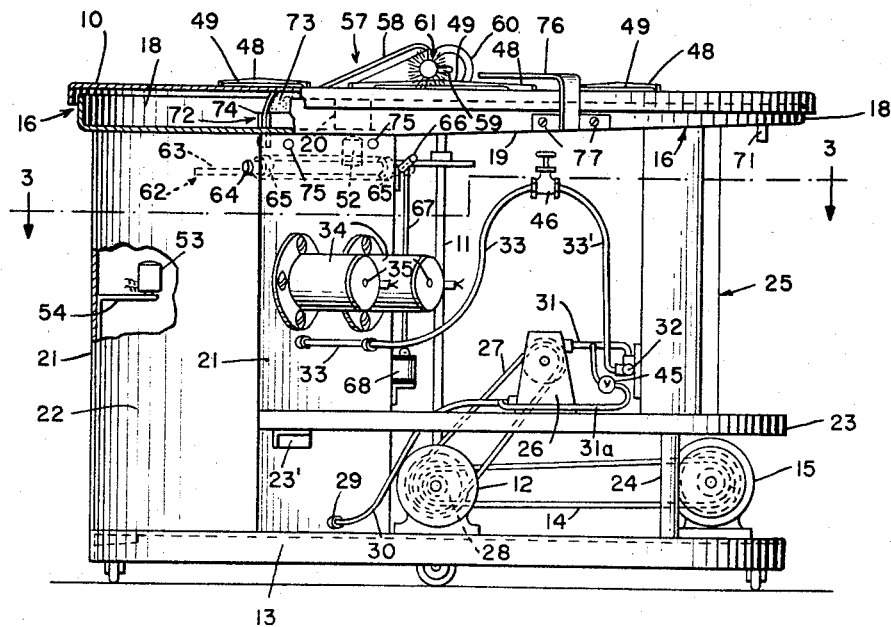
Fig. 2 is a side elevational view partly broken away of the centrifugal coating machine shown in Fig. 1.
Figure 3:
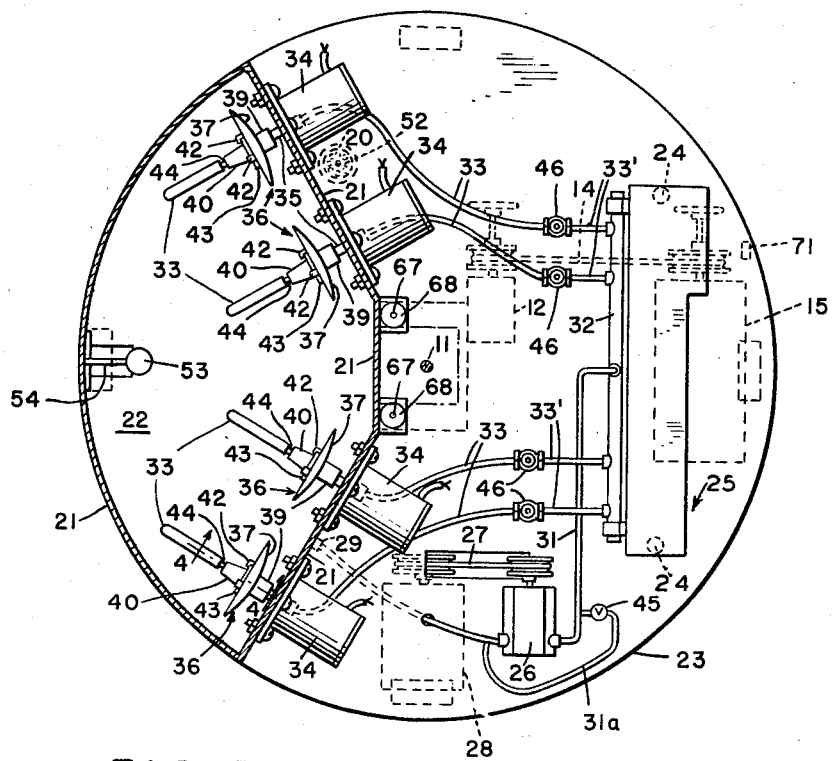
Fig. 3 is a cross-sectional view taken along line 3—3 of Fig. 2.

Referring now to the drawings and particularly to Figs. 1 and 2, a circular rotatable pan supporting platform or table 10 is affixed at its center to the upper end of a vertical drive shaft 11. The lower end of the drive shaft 11 is connected to the output side of a geared speed reducer 12 which is attached to a circular bottom frame plate 13 corresponding generally in configuration to the table 10. Speed reducer 12 is driven through appropriate variable speed sheaves and belt means 14 (Fig. 3) by a table drive motor 15 also attached to the bottom frame plate 13. Adjacent to and below table 10 is located a circular catch pan 16 and containing a relatively large aperture 17 (Fig. 6) having the general form of a sector of a circle concentric with the table 10 and catch pan 16 but truncated near the apex. The outer periphery of the catch pan 16 is turned upwardly to form a flange 18, the upper edges of the flange 18 being horizontal and the pan bottom 19 tapering generally toward the aperture 17. A flanged opening 20 is provided in the pan bottom 19 adjacent to one radial side of the aperture 17.

The catch pan 16 is positioned in parallel spaced relation to the bottom frame plate 13 by grease reservoir side plates 21. The upper edges of side plates 21 are welded or otherwise fastened to the pan 16 along the periphery of the aperture 17 while the lower edges of the side plates 21 are welded or otherwise fastened to the bottom frame plate 13. The side plates 21 and the bottom frame plate 13 define a grease reservoir 22. A removable horizontal shelf 23 is located intermediate the bottom frame plate 13 and the catch pan 16, being supported on one end by a bracket 23′ affixed to the grease reservoir side plates 21 and on the other end by a shelf support 24. A vertical control panel 25 is supported on the shelf 23 and extends upwardly to the catch pan 16.

A sanitary grease pump 26 is mounted on the shelf 23 and is driven through appropriate belt means 27 by a pump drive motor 28 mounted on the bottom frame plate 13. Grease is withdrawn from the grease reservoir 22 through a grease outlet 29 and a grease conduit 30 to the inlet port of the grease pump 26. From the outlet port of the grease pump 26, grease under pump pressure is carried by a grease conduit 31 to the central portion of a grease manifold 32 which may be located on or near the shelf 23. From the grease manifold 32, grease is carried by grease conduits 33 to the several centrifugal flinging elements located within the grease reservoir 22 as hereinafter described.

As shown in Fig. 2 the grease conduits 33 leading from the manifold 32 to the flinging elements 36 are provided with an upwardly disposed loop portion 33′. The upwardly disposed loop 33′ provides a hydraulic head acting against the manifold 32 and thus enables a single grease pump 26 to be utilized to supply grease to a plurality of flinging elements 36. The minimum hydraulic head required to insure substantially equal grease flow in the several grease conduits 33 varies with the geometry of the manifold and grease conduit system, the quantity and velocity of grease flowing through the system, and the viscosity of the grease. The manifold 32 should be so placed as to obtain as large a head as possible. Furthermore it will be apparent that it is desirable that the grease carrying capacity of grease conduit 31 be equal to or greater than the combined grease carrying capacity of the several grease conduits 33. Thus if four grease conduits 33 are utilized, the inside diameter of conduit 31 should be about twice the inside diameter of each conduit 33.

Intermediate the shelf 23 and the catch pan 16 on the flat portions of the side plates 21 of the grease reservoir 22 are mounted a plurality of electric motors 34, one motor being provided for each grease flinging element 36. The motors 34 are affixed to the flat portions of the side plates 21 so that the motor drive shafts 35 are approximately normal to the side plates 21 and extend therethrough to the interior portion of the grease reservoir 22. Suitable gasket or seal means (not shown) may be provided so as to prevent the passage of grease past the motor drive shafts 35.

Figure 5:
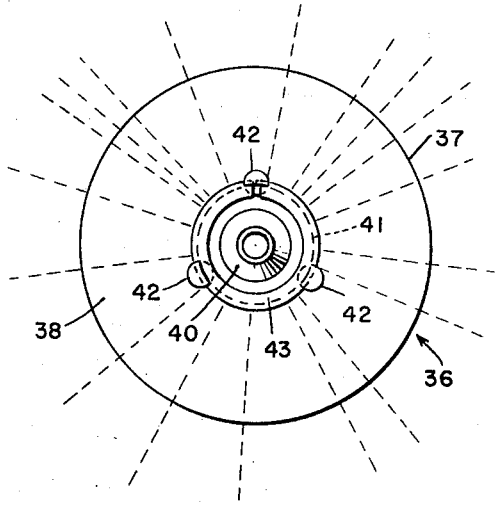
Fig. 5 is an enlarged front elevational view of one of the centrifugal flinging elements.
Figure 4:
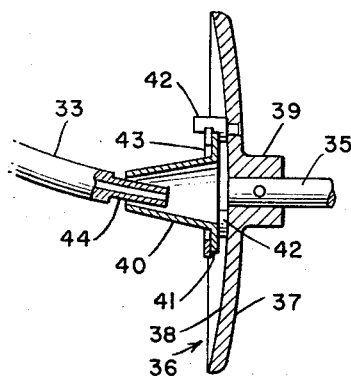
Fig. 4 is an enlarged cross-sectional view of one of the centrifugal flinging elements taken along line 4—4 of Fig. 3.

Flinging elements 36 are mounted within the grease reservoir 22 on the respective motor drive shafts 35. The flinging elements 36 (Figs. 4 and 5) each comprises essentially two parts, one of which, indicated at 37, is in the form of a circular plate having a dished surface 38 and a hub portion 39 by which the plate 37 may be affixed to the motor drive shaft 35. The second part of the flinging element is in the form of a truncated cone 40 with a flange 41 formed at the base of the cone portion 40. The cone element 40 is spaced apart from the plate 37 element by means of studs 42. The cone flange 41, circular plate 37 and studs 42 are maintained in fixed relation to each other by a spring ring 43. The relationship between the truncated cone element 40 and the circular plate element 37 is thus such that fluid may pass therebetween. A nozzle 44 is mounted on the free end of each grease conduit 33 and is positioned partially within the truncated cone element 40 at the apex end of the cone element 40.

When the flinging elements 36 are rotated at a high speed, liquid such as grease, paint, or the like delivered to the central area of the dished plate 37 via the truncated cone 40, nozzle 44 and grease conduit 33 is forced outwardly along the surface of the dished plate 37 to the edges thereof and thence delivered in all directions in the plane of the flinging elements to the undersurface of the table 10, the inner surface of the pans carried on the table 10 and the grease reservoir. The grease leaving the edges of the flinging element 36 forms a spray which is generally confined to a plane substantially normal to the motor drive shaft 35. In order to control the quantity of grease dispensed by the flinging elements 36, a bypass valve 45 may be located in the grease conduit 31a, if desired. In like manner, if it is desired to vary the relative amount of grease dispensed by the various flinging elements 36, individual valves 46 may be incorporated into the grease conduits 33 leading from the manifold 32 to the flinging elements 36. The quantity of grease delivered to the pans may also be varied by varying the angular velocity of the rotatable table 10 by means of the variable speed sheaves and belt means 14.

The grease distributed to a given area situated in the path of the grease spray is inversely proportional to the distance of that area from the flinging elements 36. Furthermore since the grease leaving the flinging elements 36 forms a spray which is confined generally to a plane substantially normal to the motor drive shafts 35, a maximum amount of grease will be deposited on those areas which lie in planes normal to the plane defined by the grease spray leaving the flinging elements 36 while a minimum amount of grease will be deposited on those areas which lie in planes parallel to the plane defined by the grease spray leaving the flinging elements 36. If deep pans or pans with straight sides are to be greased, it is apparent that the pan sides may receive a considerably smaller amount of grease than the pan bottom since the pan bottom will lie in a plane normal to the plane of the grease spray while the pan sides may lie in a plane which may be nearly parallel to the plane of the grease spray.

A more uniform distribution of grease as between the bottom and sides of the pan to be greased may be attained by canting the motors 34 and motor drive shafts 35 upwardly so that the plane of rotation of the flinging elements 36 makes an acute angle with the plane of the rotatable table 10. The angle between the plane of the rotatable table 10 and the plane of rotation of the flinging elements 36 may vary as desired from about 30° to about 90° but preferably will be in the range of 45° to 90°.

The rotatable table 10 may be provided with a plurality of apertures 47 corresponding in size and configuration to the inner surface of the pans to be greased and arranged in a circle concentric with respect to the rotatable table 10. In order to insure the proper location of pans over the apertures 47, pan stops 48 may be provided. If the apertures 47 are circular in configuration, the pan stops 48 may comprise circular arcs concentric with respect to the apertures 47 and of a suitably larger radius. If the apertures 47 are other than circular in configuration, e.g. rectangular, the pan stops 48 may have the form of a right angle positioned parallel respectively to two sides of the rectangular aperture. Rod supports 49 extending across the diameter of the apertures 47 and slightly above the surface of the table 10 may be provided, if desired, to assist in maintaining the pans in proper register over the apertures 47.

While it may be desired to provide a series of rotatable tables 10 for the coating machine embodying the present invention, each table 10 having apertures 47 designed to accommodate a particular size and type of pan, it may be found convenient to provide a single table 10 which may be adapted to accommodate a variety of pan types and sizes. In such event the table 10 may be provided with a plurality of large apertures 50 which may have the configuration of circular sectors truncated at the apex. A series of replaceable panels 51 adapted to fit into the apertures 50 is then provided, each of which may have at least one aperture 47 of the desired configuration to accommodate a particular size and type of pan.

It is important to insure that the pans to be greased are properly registered over the apertures 47 of the table 10. Improper registry of the pans may result not only in incomplete greasing of the pan but also in contamination of the adjacent work areas by grease dispensed by the flinging elements 36 through the partially exposed apertures 47. In order to detect improper registry of pans over the apertures 47, a further feature of the present invention provides photoelectric cell detecting circuits. Below the catch pan 16 and aligned with the flanged opening 20 and the locus of the apertures 47 is located a suitable photoelectric cell 52. A second photoelectric cell 53 wired in parallel with photoelectric cell 52 is mounted on a suitable bracket 54 on the bottom frame plate 13 within the grease reservoir 22. In the event that a pan is not properly registered over an aperture 47 and thus does not shield completely either of the photoelectric cells 52 or 53, light impinging on the unshielded photoelectric cell will actuate a relay 55 which will open a magnetic switch controller 56, thereby stopping the table drive motor 15 and the rotatable table 10 and causing baffles, hereinafter described, to be actuated. It will be apparent that proper operation of the photoelectric cell detecting circuits is predicated on the assumption that the light intensity in the room in which the machine is to be operated is sufficiently great to actuate the photoelectric cells. If this is not the case an auxiliary light source may be provided.

Since it is undesirable that the machine should automatically stop at frequent intervals, a further feature of the present invention provides an automatic pan locating device 57 which is adapted to correct minor misalignments of the pan with respect to the apertures 47. The pan locating device 57 may comprise a bracket 58 affixed to the machine frame somewhat in advance of the photoelectric cell 52, with respect to the direction of rotation of the table 10. The bracket 58 carries a shaft 59 in a suitable bearing. On the outer end of the shaft 59 there is mounted a friction wheel 60 adapted to contact the outer periphery of the rotatable table 10 and to be driven thereby. On the inner end of the shaft 59 there is located a brush wheel 61 adapted frictionally to engage the bottoms of the pans to be greased and to urge these pans against the respective pan stops 48. The pan locating device 57 may also be driven by a suitable electric motor or other means, if desired.

The photoelectric detecting cells 52 and 53 and associated electric circuit means previously described provide means whereby the rotatable table 10 will be brought to rest in the event of mislocation of pans or interruption in the flow of pans. However, it is also desirable to provide a baffle over the grease flinging elements 36 so that when the table 10 is stopped, as a result of the actuation of either photoelectric cell 52 or 53 pans may be removed from any aperture 47 without resulting in the escape of grease into the work area. A further feature of the present invention provides a pair of baffle assemblies 62 mounted on the inside flat surfaces of the grease reservoir side plates 21 directly above the location of the flinging elements 36. Each baffle assembly 62, comprises a flat plate 63 mounted on a horizontal shaft 64 held by suitable bearings 65. One end of each shaft 64 passes through the grease reservoir side plates 21. A suitable bell crank 66 is mounted on the end of each shaft 64 which extends through the grease reservoir side plates 21. By means of linkages 67 and bell cranks 66, the baffle assemblies 62 are connected to respective solenoids 68. The baffle assemblies 62 are so constructed that in their normal condition the baffle plates 63 will be normal to the rotatable table 10 below which they are located and will thus not interfere in the upwardly directed flow of grease from the flinging elements 36. Upon actuation of the solenoids 68, however, the baffle plates 63 will be rotated through an angle of about 90° so as to be substantially parallel to the rotatable table 10 and thereby interpose surfaces which will deflect grease dispensed in an upward direction by the flinging elements 36. The solenoids 68 are controlled by the relay 55 which may be actuated by either of the photoelectric cells 52 and 53. Thus even if, during operation of the machine, a pan is removed from an aperture 47 located directly above the flinging elements 36 no grease will be discharged through such aperture 47 and into the adjacent work area.

In accordance with a further feature of the invention, it may be found desirable to provide a grease scraper device 72 adapted to remove substantially all of the grease which may adhere to the under surface of the rotatable table 10. The grease scraper device 72 preferably is mounted near the upper edge of the radial portion of the grease reservoir side plate 21 which is approximately opposite the pan locating device 57 i.e. beyond the flinging element locations with respect to the direction of rotation of the table 10, and comprises a flexible grease resistant scraper member 73 affixed to the side plate 21 by a flat plate 74 and fasteners 75 so as to return the grease scraped into the reservoir.

It may be desirable to provide means automatically to remove the greased pans from the rotatable table 10. In such event a removable arm 76 is provided, one end of which is affixed by fasteners 77 to the catch pan 16 so that the free end of the arm 76 extends in a substantially radial direction across and somewhat above the rotatable table 10 and terminates at a point near the center of the table 10. A greased pan contacting the arm 76 is urged off the table 10 as the latter rotates. A suitable platform or conveyor (not shown) may be provided to receive the ejector pans.

Operation of the coating machine according to the present invention may be controlled from the control panel 25. The control panel 25 contains flinging element motor controllers 69 which control the several flinging element motors 34, a grease pump motor controller 70 which controls the operation of the grease pump drive motor 28, the magnetic switch controller 56 which controls the table drive motor 15, and the relay 55. For convenience, a starter button 71 may be located on the catch pan 16 adjacent to the outer edge of the rotatable table 10. The starter button 71 will activate the magnetic switch 56 thereby starting the table drive motor 15 provided that the photoelectric detecting devices have not caused the switch 56 to be maintained in the open position. It may be found desirable to reverse the direction of rotation of any of flinging element motors 34 so as to provide a more uniform distribution of grease on the pans which are to be greased. This may be accomplished by providing controllers 69 for each flinging element motor 34 which have "forward," "reverse" and "off" positions.

The operation of the coating machine may be described as follows: Pans to be greased are located over the apertures 47 in the rotatable table 10. Each flinging element motor is then started by closing the respective controller 69 and the grease pump drive motor 28 is started by closing controller 70. The bypass valve 45 and the valves 46, if provided, may then be adjusted so that the desired quantity of grease is dispensed by the flinging elements 36. The above steps having been accomplished, the switch 71 may be closed which actuates the magnetic switch controller 56 thereby starting the table drive motor 15 which in turn drives the table in a counterclockwise direction when viewed as in Figs. 1 and 6. As the table 10 rotates, additional pans are placed successively over the apertures 47 as the apertures pass the operator's location near the starting switch 71. If desired the pans may be delivered on a conveyor and automatically loaded on the table 10, as by a ram mechanism or the like. As the table 10 rotates the pans first pass under the pan locating device 57 which corrects minor misalignments of the pans. The pans then pass over the photoelectric cell 52. If the pans are properly located at this point, the table 10 will continue to rotate and as the pans pass the flinging element locations, grease from the flinging elements 36 will be deposited upon the inside surface of the pans. After passing the flinging element locations, the greased pans will strike the arm 76 and be displaced from the table 10 to appropriate conveyor or collecting means.

If the pan as it passes the photoelectric cell 52 is not properly located, the photoelectric cell 52 will actuate the relay 55 which will open the magnetic switch controller 56 thereby stopping the table drive motor 15 and the table 10. Simultaneously the relay 55 energizes the solenoids 68 which actuate the linkages 67 to rotate the baffle plates 63 into baffling position over the flinging elements 36. After the machine has been stopped because of pan misalignment, it may be started again by first relocating the misaligned pan and then closing the starter switch 71. In like manner, if the pan as it passes photoelectric cell 53 is not properly located, the photoelectric cell 53 will actuate the relay 55 which will open the magnetic switch controller 56 thereby stopping the table drive motor 15 and table 10. If desired the grease pump and flinging motors may be stopped at the same time as the drive motor although it is preferable to maintain these in operation and to rely on the baffle plates to prevent escape of grease.

While the invention has been described in connection with a specific embodiment thereof and in a specific use, various modifications thereof will occur to those skilled in the art without departing from the spirit and scope of the invention as set forth in the appended claims.

What is claimed is:

1. A centrifugal coating machine for applying grease to baking pans and the like, comprising a rotatable pan supporting platform having a plurality of apertures therein each conforming in size and shape to the pan surface to be coated, means to rotate said platform, a grease chamber having an open end arranged periodically to be in alignment with successive apertures as said platform is rotated, a plurality of spaced centrifugal disc shaped grease flinging elements disposed within said grease chamber and arranged when rotated at high speed to discharge grease from the peripheral edge of said flinging elements through said open end of said chamber under centrifugal action, means to supply grease under pressure to a central portion of said disc shaped flinging elements, means to rotate said flinging elements, said flinging elements discharging grease through said apertures and into contact with pan surfaces periodically aligned with said grease flinging elements, photoelectric cell detecting means disposed on one side of said rotatable pan supporting platform, said detecting means being disposed in advance of said flinging elements with respect to the direction of rotation of said platform, and being periodically aligned with said apertures, electric circuit means including relay means and solenoid means, and baffle means disposed within said grease chamber and above said flinging elements, whereby the absence or misalignment of pans to be coated from the said apertures in the said platform generates a signal in said detecting means which actuates said relay means and said solenoid means in turn, said solenoid means causing said baffle means to rotate from a first position substantially parallel to and displaced from the plane of rotation of said flinging elements to a second position substantially perpendicular to the plane of rotation of said flinging elements thereby preventing the grease discharged from said flinging elements from passing through said apertures in said platform.

2. A centrifugal coating machine for applying coating material to an article surface comprising a rotatable article supporting platform having a first aperture therein, a removable panel having a second aperture therein conforming in size and shape of the surface to be coated, said first aperture conforming in size and shape to said removable panel, means to rotate said platform, a coating material chamber having an open end arranged periodically to be in alignment with said second aperture as said platform is rotated, a plurality of spaced centrifugal disc shaped coating material flinging elements disposed within said chamber and arranged when rotated at high speed to discharge coating material from the peripheral edge of said flinging elements through said open end of said chamber under centrifugal action, said flinging elements being arranged within said chamber so that the axes of said flinging elements form an acute angle with the plane of rotation of said rotatable article supporting platform, means to supply coating material under pressure to a central portion of said disc shaped flinging elements, said flinging elements discharging coating material through said second apertures and into contact with article surfaces periodically aligned with said flinging elements, rotatable brush means disposed above said rotatable platform and in advance of said flinging elements with respect to the direction of rotation of said platform and arranged to urge the articles to be coated into proper register with said second aperture and automatically correct minor misalignment of said articles, means to rotate said rotatable brush means, photoelectric cell detecting means disposed on one side of said platform intermediate said flinging elements and said rotatable brush means, electric circuit means including relay means and solenoid means, and baffle means disposed within said coating material chamber and above said flinging elements, the absence or uncorrected misalignment of articles to be coated from the said second apertures in the said platform generating a signal in said detecting means which actuates said relay means and said solenoid means in turn, the said relay means deactuating said means to rotate said platform and the said solenoid means causing said baffle means to rotate from a first position substantially parallel to and displaced from the plane of rotation of said flinging elements to a second position substantially perpendicular to the plane of rotation of said flinging elements thereby preventing the grease discharged from said flinging elements from passing through said second aperture in said platform.

3. A centrifugal coating machine for applying coating material to an article surface comprising a rotatable article supporting platform having a first aperture therein, a removable panel having a second aperture therein conforming in size and shape to the surface to be coated, said first aperture conforming in size and shape to said removable panel, means to rotate said platform, a coating material chamber having an open end arranged periodically to be in alignment with said second aperture as said platform is rotated, a plurality of spaced centrifugal disc shaped coating material flinging elements disposed within said chamber and arranged when rotated at high speed to discharge coating material from the peripheral edge of said flinging elements through said open end of said chamber under centrifugal action, means to supply coating material under pressure to a central portion of said disc shaped flinging elements, said flinging elements discharging coating material through said second apertures and into contact with article surfaces periodically aligned with said flinging elements, rotatable brush means disposed above said rotatable platform and in advance of said flinging elements with respect to the direction of rotation of said platform and arranged to urge the articles to be coated into proper register with said second aperture and automatically correct minor misalignment of said articles, means to rotate said rotatable brush means, photoelectric cell detecting means disposed on one side of said platform intermediate said flinging elements and said rotatable brush means, electric circuit means including relay means and solenoid means, and baffle means disposed within said coating material chamber and above said flinging elements, the absence or uncorrected misalignment of articles to be coated from the said second apertures in the said platform generating a signal in said detecting means which actuates said relay means and said solenoid means in turn, the said relay means deactuating said means to rotate said platform and the said solenoid means causing said baffle means to rotate from a first position substantially parallel to and displaced from the plane of rotation of said flinging elements to a second position substantially perpendicular to the plane of rotation of said flinging elements thereby preventing the grease discharged from said flinging elements from passing through said second aperture in said platform.

References Cited in the file of this patent
UNITED STATES PATENTS

| | | |
|---|---|---|
| 1,443,407 | Wittman | Jan. 30, 1923 |
| 2,499,621 | Archer | Mar. 7, 1950 |
| 2,741,214 | Tench et al. | Apr. 10, 1956 |
| 2,811,130 | Friderici | Oct. 29, 1957 |
| 2,876,736 | Riddington et al. | Mar. 10, 1959 |